(12) United States Patent
Lin

(10) Patent No.: US 9,719,656 B2
(45) Date of Patent: Aug. 1, 2017

(54) ASPHERIC LENS AND EMISSION DEVICE

(71) Applicant: HON HAI PRECISION INDUSTRY CO., LTD., New Taipei (TW)

(72) Inventor: Po-Yu Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/013,673

(22) Filed: Feb. 2, 2016

(65) Prior Publication Data

US 2017/0074482 A1    Mar. 16, 2017

(30) Foreign Application Priority Data

Sep. 15, 2015 (TW) ................... 104130384 A

(51) Int. Cl.
*F21V 3/00* (2015.01)
*F21V 5/04* (2006.01)
*G02B 3/04* (2006.01)
*F21Y 115/10* (2016.01)
*F21Y 115/30* (2016.01)

(52) U.S. Cl.
CPC ............... *F21V 5/04* (2013.01); *G02B 3/04* (2013.01); *F21Y 2115/10* (2016.08); *F21Y 2115/30* (2016.08)

(58) Field of Classification Search
CPC ................................. F21V 5/04; G02B 3/04

USPC ............................................ 362/311.06
See application file for complete search history.

(56) References Cited

U.S. PATENT DOCUMENTS

| | | | |
|---|---|---|---|
| 7,798,679 B2* | 9/2010 | Kokubo | F21V 5/048 362/334 |
| 7,963,680 B2* | 6/2011 | Yoon | F21V 5/04 359/366 |
| 8,967,833 B2* | 3/2015 | Wang | F21V 5/04 359/708 |
| 9,169,992 B2* | 10/2015 | Wang He | F21V 5/048 |
| 9,484,510 B2* | 11/2016 | Kim | G02B 19/0014 |
| 2007/0029563 A1* | 2/2007 | Amano | F21S 48/1145 257/98 |
| 2007/0258247 A1* | 11/2007 | Park | G02B 5/0231 362/326 |
| 2008/0297020 A1* | 12/2008 | Wanninger | G02B 27/0927 313/110 |
| 2009/0116245 A1* | 5/2009 | Yamaguchi | G02B 3/04 362/311.01 |
| 2012/0268950 A1* | 10/2012 | Parkyn | F21V 5/04 362/335 |

* cited by examiner

*Primary Examiner* — Bryon T Gyllstrom
(74) *Attorney, Agent, or Firm* — Steven Reiss

(57) ABSTRACT

An aspheric lens is rotating symmetrically with a central optical axis, the aspheric lens includes a first optical surface and a second optical surface opposite to the first optical surface, the second optical surface includes a first portion, the first portion is formed in a rotation symmetrical formed with the central optical axis and is flat.

11 Claims, 5 Drawing Sheets

ASPHERIC LENS AND EMISSION DEVICE

FIELD

The subject matter herein generally relates to an aspheric lens.

BACKGROUND

In the solid-state lighting technology, the light emission device includes a lens and a light emitting diode, providing area illumination with a uniform distribution of emission intensity. General lighting needs a surface light source device; however, the light emitting diode is a point-like light source.

BRIEF DESCRIPTION OF THE DRAWINGS

Many aspects of the disclosure can be better understood with reference to the following drawing. The components in the drawing are not necessarily drawn to scale, the emphasis instead being placed upon clearly illustrating the principles of the disclosure. Implementations of the present technology will now be described, by way of example only, with reference to the attached figure.

DETAILED DESCRIPTION

Figure 1:
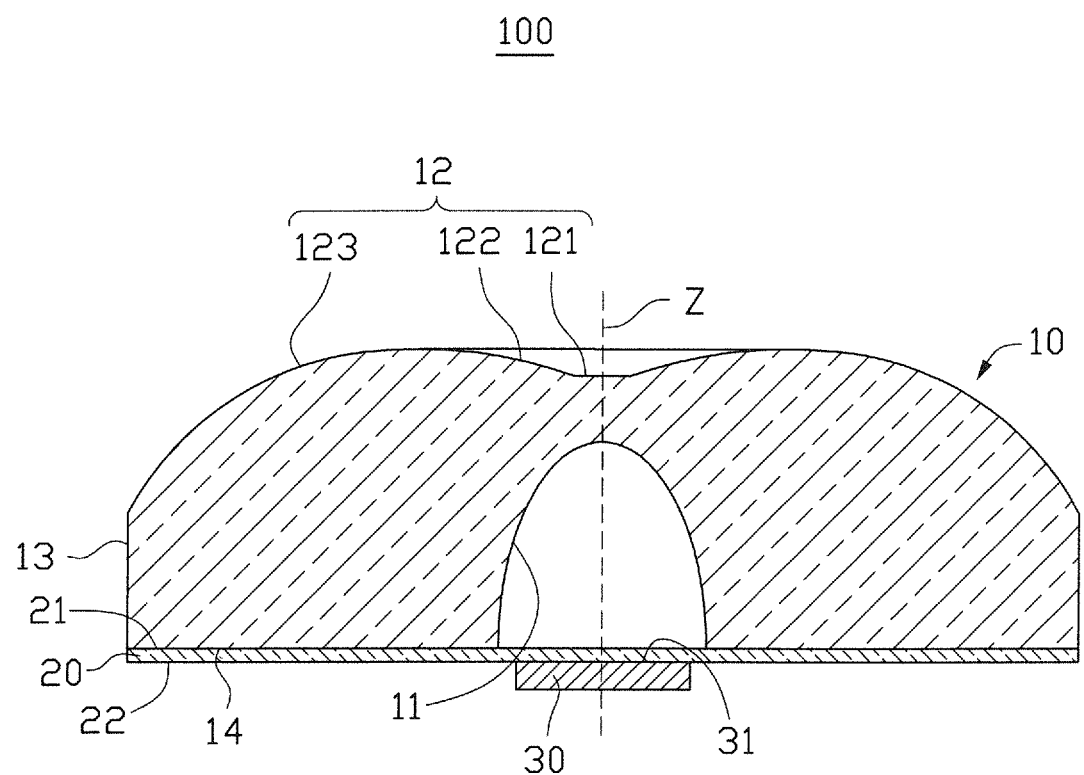
FIG. 1 is a diagrammatic, cross sectional view of an aspheric lens according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

The present disclosure relates to an aspheric lens.

FIG. 1 is an emission device 100 which is rotating symmetrically with a central optical axis Z. The emission device 100 includes an aspheric lens 10, a glue layer 20, and a light emitting device 30. The layer 20 is positioned on the light emitting device 30.

The aspheric lens 10 includes a first optical surface 11, a second optical surface 12 opposite to the first optical surface 11, a side surface 13, and a bottom surface 14. The first optical surface 11 corresponds to the light emitting device 30. The side surface 13 is interconnected between the second optical surface 12 and the bottom surface 14. The bottom surface 14 surrounds the first optical surface 11 opposite to the second optical surface 12.

Figure 2:
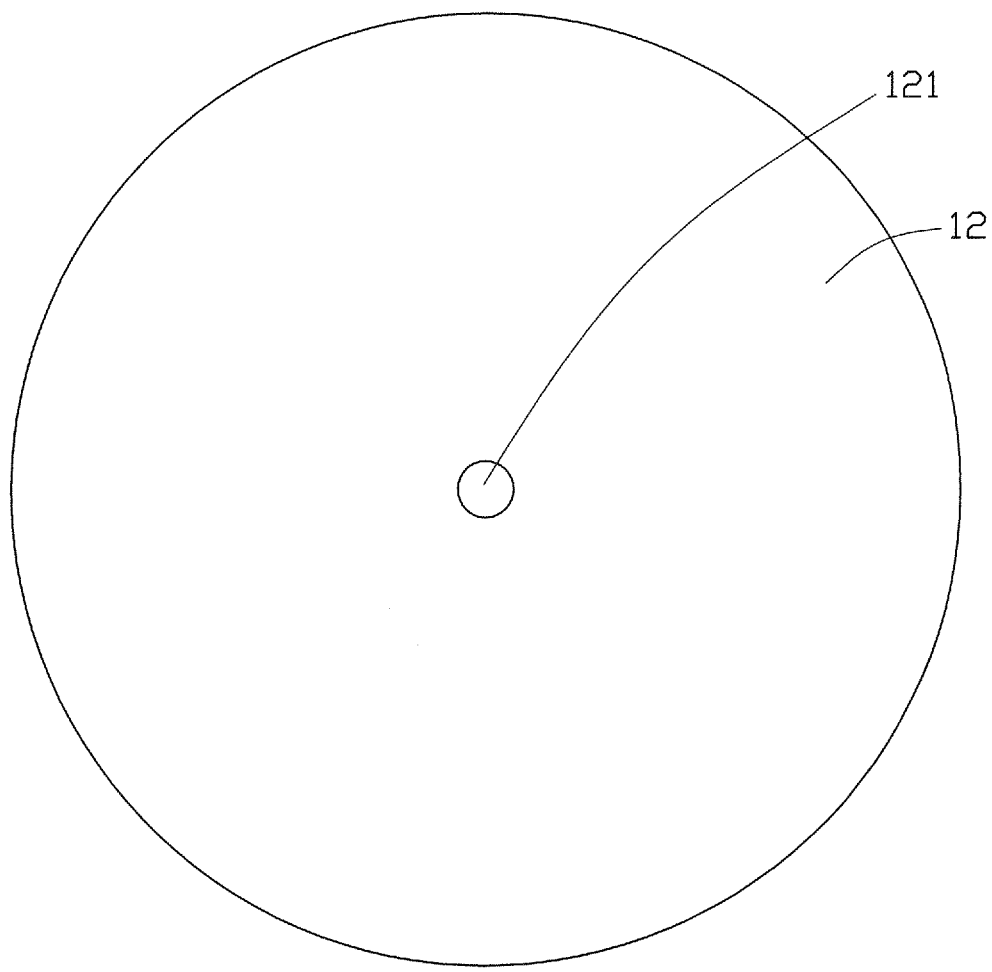
FIG. 2 is a diagrammatic, top view of the aspheric lens in FIG. 1 viewing from a second optical surface of the aspheric lens.

FIG. 2 illustrates the second optical surface 12 of the aspheric lens 10 with a first portion 121. The second optical surface 12 further includes a second portion 122, and a third portion 123 as shown in FIG. 1. The first portion 121 is formed in a rotation symmetrically formed with the optical axis Z and is flat. The second portion 122 is interconnected between the first portion 121 and the third portion 123 and is a first curve surface which has a slope larger than zero for each point of the first curve surface. The third portion 123 is interconnected between the second portion 122 and the side surface 13 and is a second curve surface which has a slope less than zero for each point of the second curve surface. In the illustrated embodiment, the first portion 121 is a round plane and a radius of the round plane of the first portion 121 is less than 1 mm.

The glue layer 20 includes a first face 21, and a second face 22 opposite to the first face 21. The layer 20 has a high refractive index and a high transmittance for the rays from the light emitting device 30 and is configured to protect the light emitting device 30 against damage. The layer 20 is also a light guide structure and guides the rays from the light emitting device 30 to put into the aspheric lens 10.

The light emitting device 30 includes an emission surface 31, and a plurality of light points defined on the emission surface 31, the light emitting device 30 corresponds to the first optical surface 11. The layer 20 is positioned on the emission surface 31.

The first face 21 is connected to the bottom surface 14, the second face 22 covers the emission surface 31. In at least one embodiment, the light emitting device 30 is a light emitting diode (LED). In other embodiments, the light emitting device 30 may be a laser diode (LD).

Figure 3:
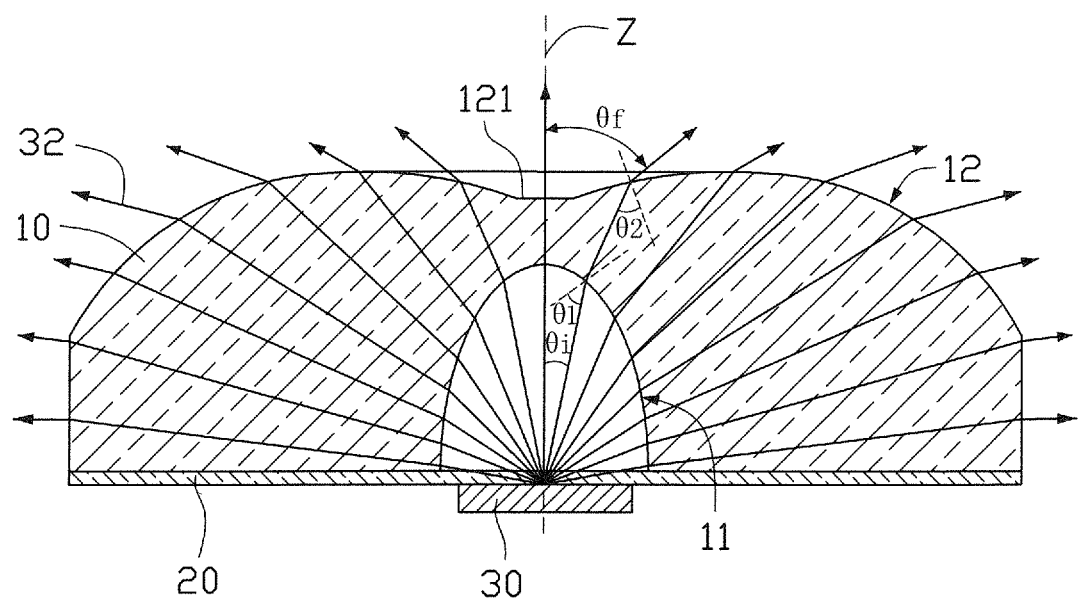
FIG. 3 is a cross sectional view of the aspheric lens in FIG. 1 with light traces emitting from a light emitting device positioned at the optical axis.
Figure 4:
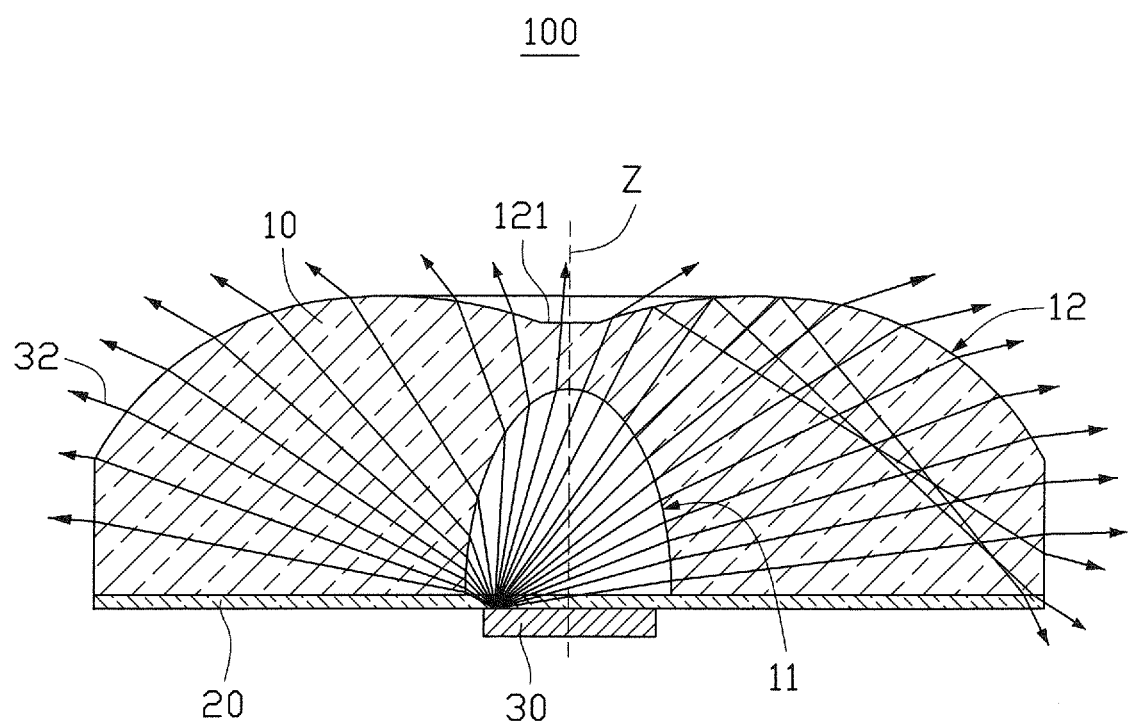
FIG. 4 is a cross sectional view of the aspheric lens in FIG. 1 with light traces emitting from a light emitting device positioned outside of the center optical axis.

FIG. 3 and FIG. 4 illustrate the aspheric lens 10 with light traces. The symbols listed below are used in the illustrated embodiment.

$\theta_i$: an emission angle between the optical axis Z and the rays 32 emitted from the light emitting device 30, $\theta_f$: the emission angle between the optical axis Z and the rays 32 emitted from the second optical surface 12, $\theta_1$: an incident angle between the rays 32 emitted from the light emitting device 30 and a normal line of the first optical surface 11 at the incident point, $\theta_2$: the incident angle between the rays 32 in the aspheric lens 10 and the normal line of the second optical surface 12, $\theta_f$ further satisfies the formula:

$$\theta_f = \theta_1 - \sin^{-1}\frac{\sin\theta_1}{n} + \sin^{-1}(n\sin\theta_2) + \theta_i \quad (1)$$

The light point of the light emitting device 30 in FIG. 3 is positioned at the optical axis Z. The relations between $\theta_i$ and $\theta_f$ for the light emitting around the portions of the second optical surface 12 are shown in TABLE 1. In the first portion 121, the relation $\theta_i=\theta_f$ is satisfied for the ray 32 with a zero degrees of $\theta_i$ passing through the second optical surface 12 from the optical axis Z. In addition, the value of $\theta_f$ is larger than that of $\theta_i$ when the ray 32 transmits in the aspheric lens 10 surrounding the optical axis Z and is refracted by the second optical surface 12. In the second portion 122 and the third portion 123, the rays 32 are refracted by the second optical surface 12 and are satisfied in the relation $\theta_i<\theta_f$.

TABLE 1

| Area | $\theta_i$ | $\theta_f$ | Relation |
|---|---|---|---|
| First portion | 0° | 0° | $\theta_i = \theta_f$ |
|  | 1.79° | 8.59° | and |
|  | 3.58° | 14.6° | $\theta_i < \theta_f$ |
| Second portion | 7.16° | 32.4° | $\theta_i < \theta_f$ |
|  | 12.53° | 48.65° |  |
|  | 17.9° | 56.16° |  |
| Third portion | 32.22° | 65.04° | $\theta_i < \theta_f$ |
|  | 46.54° | 75.65° |  |
|  | 57.28° | 73.5° |  |

FIG. 4 illustrates the light points of the light emitting device 30 for the light emitting from the surrounding of the optical axis Z and TABLE 2 shows the relations between $\theta_i$ and $\theta_f$ for the light traces in the portions of the second optical surface 12. In the first portion 121, the rays 32 are refracted by the second optical surface 12 and are satisfied in the relation $\theta_i>\theta_f$. In the second portion 122, the rays 32 are totally reflected on the second optical surface and are satisfied in the relation $\theta_i>\theta_f$. In the third portion 123, the rays 32 are refracted by the second optical surface 12 and are satisfied in the relation $\theta_i<\theta_f$.

TABLE 2

| Area | $\theta_i$ | $\theta_f$ | Relation |
|---|---|---|---|
| First portion | 14.32° | 0.65° | $\theta_i > \theta_f$ |
|  | 16.11° | 4.54° |  |
|  | 17.9° | 10.27° |  |
| Second portion | 30.43° | −58° | $\theta_i > \theta_f$ |
|  | 35.8° | −47° |  |
|  | 40.17° | −40° |  |
| Third portion | 44.75° | 79.29° | $\theta_i < \theta_f$ |
|  | 59.07° | 79.45° |  |
|  | 69.81° | 79.91° |  |

Figure 5:
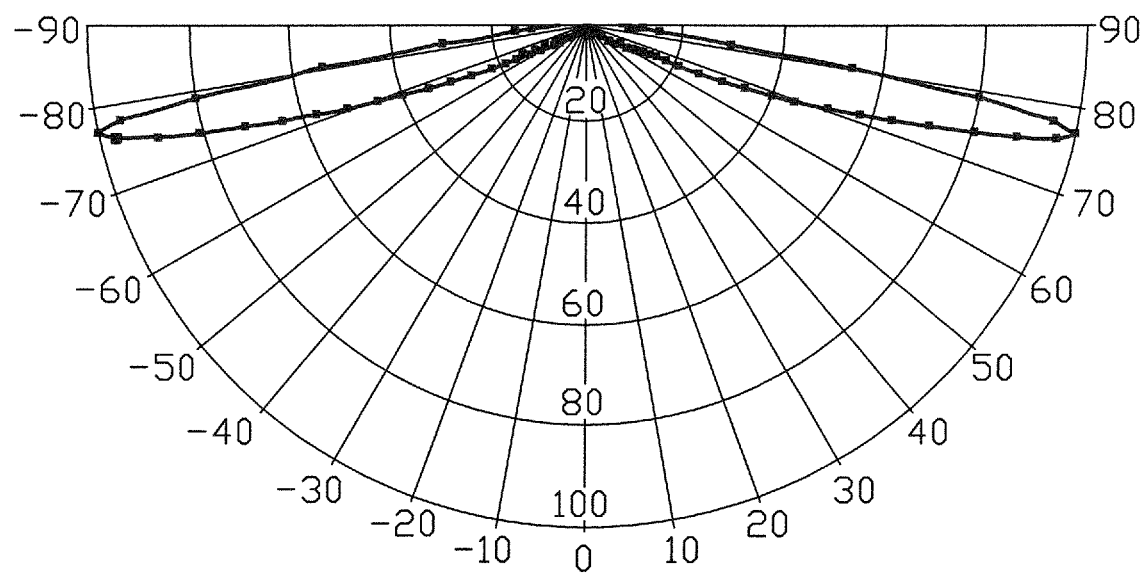
FIG. 5 is a light intensity distribution of the aspheric lens in FIG. 1 with a light emitting device positioned at the optical axis.

FIG. 5 illustrates an emission intensity distribution of the aspheric lens 10 in the embodiment. The aspheric lens 10 is configured to form a round distribution of emission intensity. A majority of the emission intensity distribution of the aspheric lens 10 are distributed in a range of the emission angle $\theta_f$ between 70°-80°.

The embodiments shown and described above are only examples. Many details are often found in the art such as the other features of an aspheric lens. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An aspheric lens, which is configured to rotate symmetrically about a central optical axis, the aspheric lens comprising:
   a first optical surface; and
   a second optical surface opposite to the first optical surface and having a first portion formed in a rotation symmetrical formed with the central optical axis, wherein the first portion is flat;
   wherein the aspheric lens includes a light emitting device corresponding to the first optical surface, the light emitting device includes a plurality of light points, the first portion of the second optical surface is configured so as to satisfy in a relation $\theta_i=\theta_f$ and $\theta_i<\theta_f$ for the light point positioned at the optical axis and satisfy in the relation $\theta_i>\theta_f$ for the light points positioned around the optical axis, where $\theta_i$ is an emission angle between the optical axis and rays emitted by the light emitting device, $\theta_f$ is the emission angle between the optical axis and the rays emitted by the second optical surface; and
   wherein the second optical surface includes a second portion formed a first curve surface, a slope of the first curve surface is larger than zero, the second portion of the second optical surface is configured so as to satisfy in the relation $\theta_i<\theta_f$ for the light point positioned at the optical axis and satisfy in the relation $\theta_i>\theta_f$ with total reflections for the light points positioned around the optical axis.

2. The aspheric lens in accordance with claim 1, wherein the second optical surface includes a third portion formed a second curve surface, a slope of the second curve surface is less than zero, the third portion of the second optical surface is configured so as to satisfy in the relation $\theta_i<\theta_f$.

3. The aspheric lens in accordance with claim 1, wherein the aspheric lens includes a side surface and a bottom surface, the side surface is interconnected between the third portion of the second optical surface and the bottom surface, the bottom surface surrounds the first optical surface opposite to the second optical surface.

4. The aspheric lens in accordance with claim 1, wherein the aspheric lens is configured to form a round distribution of emission intensity, a majority of the distribution of emission intensity of the aspheric lens are distributed in a range of the emission angle between the rays from the second optical surface and the optical axis Z between 70°-80°.

5. The aspheric lens in accordance with claim 1, wherein a radius of the first portion is less than 1 mm.

6. An emission device, which is configured to rotate symmetrically about a central optical axis, the emission device comprising:
   an aspheric lens comprising:
      a first optical surface; and
      a second optical surface opposite to the first optical surface and having a first portion formed in a rotation symmetrical formed with the central optical axis, wherein the first portion is flat; and
   a light emitting device corresponding to the first optical surface;
   wherein the light emitting device includes a plurality of light points, the first portion of the second optical surface is configured so as to satisfy in a relation $\theta_i=\theta_f$ and $\theta_i<\theta_f$ for the light point positioned at the optical axis and satisfy in the relation $\theta_i>\theta_f$ for the light points positioned around the optical axis, where $\theta_i$ is an emission angle between the optical axis and rays emitted by the light emitting device, $\theta_f$ is the emission angle between the optical axis and the rays emitted by the second optical surface; and wherein the second optical surface includes a second portion formed a first curve surface, a slope of the first curve surface is larger than zero, the second portion of the second optical surface is configured so as to satisfy in the relation $\theta_i<\theta_f$ for the light point positioned at the optical axis and satisfy in the relation $\theta_i>\theta_f$ with total reflections for the light points positioned around the optical axis.

7. The emission device in accordance with claim 6, wherein the second optical surface includes a third portion formed a second curve surface, a slope of the second curve surface is less than zero, the third portion of the second optical surface is configured so as to satisfy in the relation $\theta_i<\theta_f$.

8. The emission device in accordance with claim 6, wherein the aspheric lens includes a side surface and a bottom surface, the side surface is interconnected between the third portion of the second optical surface and the bottom surface, the bottom surface surrounds the first optical surface opposite to the second optical surface.

9. The emission device in accordance with claim 6, wherein the aspheric lens is configured to form a round distribution of emission intensity, a majority of the distribution of emission intensity of the aspheric lens are distributed in a range of the emission angle between the rays from the second optical surface and the optical axis Z between 70°-80°.

10. The emission device in accordance with claim 6, wherein a radius of the first portion is less than 1 mm.

11. The emission device in accordance with claim 6, the emission device includes a glue layer, the layer have a high refractive index and a high transmittance for rays from the light emitting device, the layer is positioned on the light emitting device.

* * * * *